US010247548B2

(12) United States Patent
Rentschler et al.

(10) Patent No.: US 10,247,548 B2
(45) Date of Patent: Apr. 2, 2019

(54) MEASURING DEPTH OF A SURFACE OF A TEST OBJECT

(71) Applicant: Siemens Aktiengesellschaft, Munich (DE)

(72) Inventors: Peter Rentschler, Neuhengstett (DE); Anton Schick, Velden (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 11 days.

(21) Appl. No.: 15/303,300

(22) PCT Filed: Mar. 25, 2015

(86) PCT No.: PCT/EP2015/056322
§ 371 (c)(1),
(2) Date: Oct. 11, 2016

(87) PCT Pub. No.: WO2015/155000
PCT Pub. Date: Oct. 15, 2015

(65) Prior Publication Data
US 2017/0030710 A1 Feb. 2, 2017

(30) Foreign Application Priority Data

Apr. 11, 2014 (DE) .................. 10 2014 207 022

(51) Int. Cl.
*G01B 11/25* (2006.01)
*G01B 11/22* (2006.01)

(52) U.S. Cl.
CPC .......... *G01B 11/2509* (2013.01); *G01B 11/22* (2013.01)

(58) Field of Classification Search
CPC .. G01B 11/2509; G01B 11/22; H04N 9/3182; H04N 9/3194; A61B 1/07; A61B 1/063;
(Continued)

(56) References Cited

U.S. PATENT DOCUMENTS 4,641,971 A * 2/1987 Korth ................. G01B 11/0633
348/135
5,986,745 A * 11/1999 Hermary ................ G01B 11/25
250/559.23

(Continued)

FOREIGN PATENT DOCUMENTS

DE  102008002730 A1  12/2009  ............. G02B 27/22
DE  102009017465 A1  10/2010  ............. G01B 11/24

(Continued)

OTHER PUBLICATIONS

Japanese Office Action, Application No. 2017504247, 4 pages, dated Oct. 2, 2017.

(Continued)

*Primary Examiner* — Mohamed K Amara
(74) *Attorney, Agent, or Firm* — Slayden Grubert Beard PLLC

(57) ABSTRACT

A method for measuring the depth of a surface of a test object may include projecting a colored fringe pattern formed by a sequence of colored fringes onto a surface of the test object, and detecting and evaluating a fringe pattern reflected by the surface of the test object using an evaluation device. The colored fringe pattern and the evaluation device may be designed such that the depth of the surface of the test object is measured based on the sequence of colored fringes of the reflected fringe pattern and based on a sequence of fringe widths of the reflected fringe pattern.

14 Claims, 4 Drawing Sheets

(58) Field of Classification Search
CPC . A61B 5/1076; A61B 5/1079; A61B 1/00096; A61B 1/00163; A61B 1/00179; A61B 5/0084; A61B 1/04; A61B 1/018; A61B 1/00009; G02B 27/425; G02B 27/4222; G02B 27/0944; G02B 23/2461; G02B 23/2469

See application file for complete search history.

(56) References Cited

U.S. PATENT DOCUMENTS

| | | | | |
|---|---|---|---|---|
| 6,341,016 | B1* | 1/2002 | Malione | G01B 11/2509 345/419 |
| 6,937,348 | B2* | 8/2005 | Geng | G01B 11/2509 356/602 |
| 7,456,842 | B2* | 11/2008 | Kosolapov | G01B 11/2509 345/549 |
| 7,929,752 | B2* | 4/2011 | Je | G01B 11/2509 382/154 |
| 8,908,958 | B2* | 12/2014 | Kimmel | G01B 11/2509 382/154 |
| 9,404,741 | B2 | 8/2016 | Schick | |
| 2004/0258297 | A1* | 12/2004 | Yeh | G01B 11/2509 382/154 |
| 2005/0200857 | A1* | 9/2005 | Christ, Jr. | G01B 11/2509 356/601 |
| 2005/0283065 | A1* | 12/2005 | Babayoff | A61B 1/00009 600/407 |
| 2006/0072122 | A1* | 4/2006 | Hu | G01B 11/2527 356/603 |
| 2007/0211258 | A1* | 9/2007 | Lee | G01B 11/25 356/605 |
| 2009/0221874 | A1 | 9/2009 | Vinther et al. | 600/178 |
| 2011/0298891 | A1* | 12/2011 | Zhang | G01B 11/2509 348/43 |
| 2011/0313721 | A1* | 12/2011 | Keshavmurthy | G01B 11/2509 702/156 |
| 2012/0162239 | A1* | 6/2012 | Marcu | G09G 5/06 345/589 |
| 2012/0229816 | A1* | 9/2012 | Rodrigue | G01B 11/245 356/610 |
| 2013/0141634 | A1* | 6/2013 | Korenaga | G02B 27/4205 348/360 |
| 2013/0218531 | A1* | 8/2013 | Deichmann | A61C 9/004 703/1 |
| 2014/0012225 | A1* | 1/2014 | Yoo | A61B 5/6835 604/503 |
| 2014/0049535 | A1* | 2/2014 | Wang | G01B 11/2509 345/419 |
| 2014/0085421 | A1* | 3/2014 | Kuth | A61B 1/00193 348/45 |
| 2015/0070473 | A1* | 3/2015 | Wang | G01B 11/2509 348/49 |
| 2015/0103358 | A1* | 4/2015 | Flascher | G01B 11/25 356/603 |
| 2017/0056136 | A1* | 3/2017 | Adamson | A61C 9/0053 |
| 2017/0258305 | A1* | 9/2017 | Hart | A61C 5/90 |

FOREIGN PATENT DOCUMENTS

| | | | | |
|---|---|---|---|---|
| DE | 102009018464 A1 | 11/2010 | | G01B 11/24 |
| DE | 102012222505 A1 | 6/2014 | | G01B 11/25 |
| JP | 2002013921 A | 1/2002 | | G01B 11/24 |
| JP | 2008157888 A | 7/2008 | | G01B 11/25 |
| WO | 2014/016001 A1 | 1/2014 | | G01B 11/25 |
| WO | 2015/155000 A2 | 10/2015 | | G01B 11/25 |

OTHER PUBLICATIONS

Japanese Decision to Grant, Application No. 2017504247, 2 pages, dated Apr. 16, 2018.

Salvi, Jaoquim et al., "Pattern Codification Strategies in Structured Light Systems," The Journal of the Pattern Recognition Society, vol. 37, No. 4, pp. 827-849 (23 pages), Oct. 2, 2003.

Yuanyuan, Fu et al., "Research on Color Encoding Structured Light 3D Measurement Technology," Optical Design and Testing III, Proc. of SPIE vol. 6834, 8 pages, 2007.

German Search Report, Application No. 102014207022.8, 8 pages, dated Aug. 2, 2014.

International Search Report and Written Opinion, Application No. PCT/EP2015/056322, 18 pages, dated Oct. 12, 2015.

Wikipedia, "Three-CCD Camera," URL: https://en.wikipedia.org/wild/Three-CCD_camera, 4 pages, Retrieved on Nov. 5, 2015.

* cited by examiner

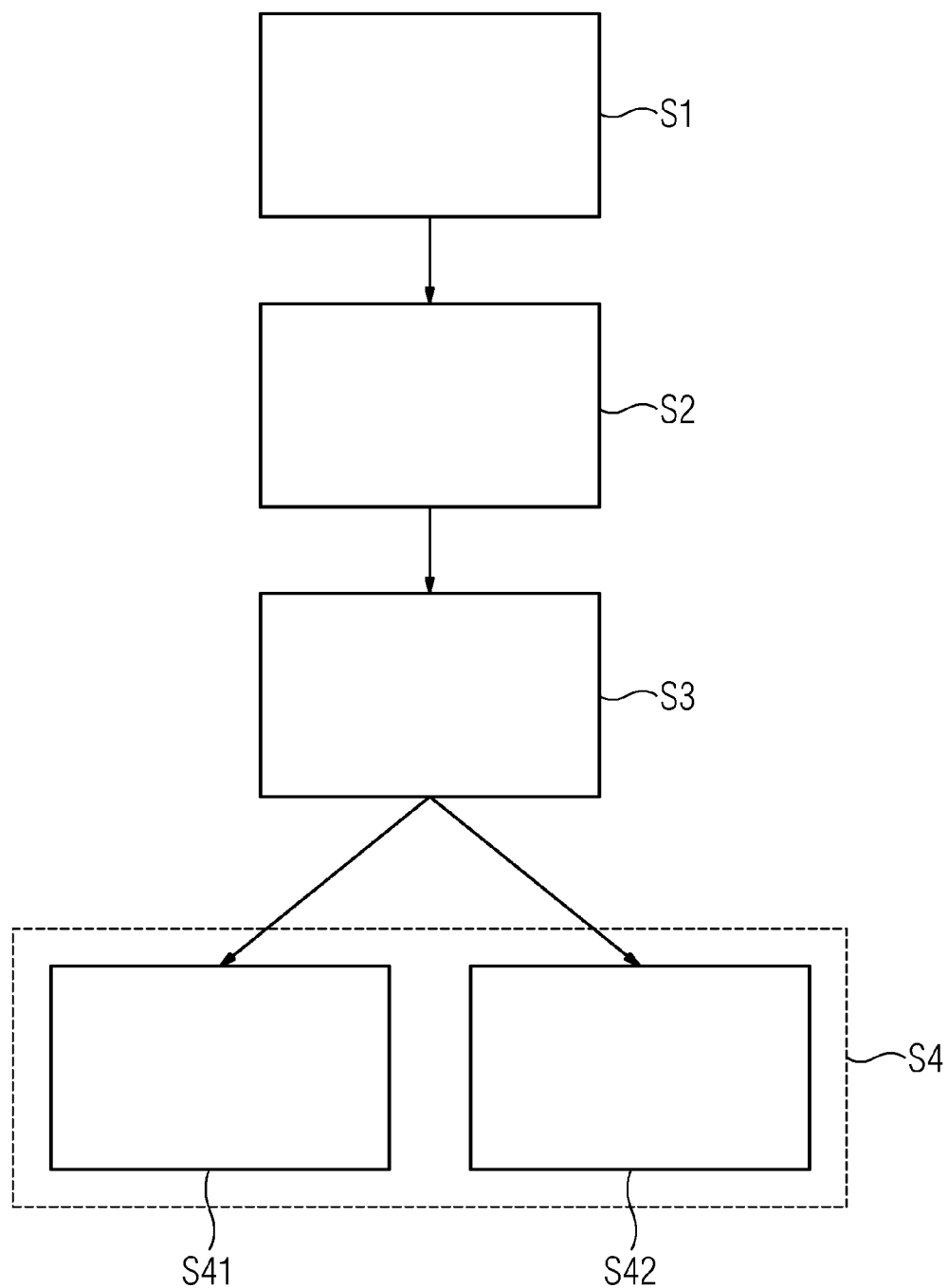

MEASURING DEPTH OF A SURFACE OF A TEST OBJECT

CROSS-REFERENCE TO RELATED APPLICATIONS

This application is a U.S. National Stage Application of International Application No. PCT/EP2015/056322 filed Mar. 25, 2015, which designates the United States of America, and claims priority to DE Application No. 10 2014 207 022.8 filed Apr. 11, 2014, the contents of which are hereby incorporated by reference in their entirety.

TECHNICAL FIELD

The invention relates to a method for measuring the depth of a surface of a test object using color-coded triangulation.

BACKGROUND

The prior art distinguishes between active and passive triangulation methods for depth determination. As opposed to passive triangulation methods, active triangulation methods exhibit structured object illumination, where the geometric characteristics of the object illumination are known. Passive methods typically use diffused daylight or spotlights as the object illumination, with at least two camera systems capturing in each case one image of the test object from different viewing directions. What is crucial is that image points that correspond in the at least two captured images are detected. Two image points are considered to be corresponding to one another if they represent the same point on the surface of the test object. The identification of corresponding image points is referred to as correspondence problem.

In active triangulation methods, the correspondence problem is mitigated. In active triangulation methods, a pattern is projected onto the surface of the test object from one specified and previously known spatial direction and is captured from a different spatial direction. Due to the curved surface of the test object, the captured pattern is distorted or deformed. It is possible to reconstruct the three-dimensional structure of the test object (depth determination) from the distortion or deformation of the pattern using appropriate algorithms.

For depth determination it is necessary for distinct features in the projected pattern to be uniquely identified in the captured, deformed or distorted pattern. If said uniqueness is not present or insufficient, the result is skips in the reconstructed three-dimensional structure of the test object.

For the purposes of improvement, the prior art suggests coded or color-coded triangulation methods. One disadvantage of the preferred color-coded triangulation methods is that, owing to absorption, color differences between the projected and captured patterns arise, which in turn lead to skips and consequently a correspondence problem. With correspondingly adapted algorithms during the evaluation of the captured pattern, an attempt is made using smoothing algorithms to interpolate said skips and/or to repair them. This is only insufficiently successful based on the prior art.

In particular in the case of surfaces which absorb colors very differently, such as for example organic tissue, typically only a small number of image points of the captured pattern is available, with the result that the correspondence problem is exacerbated when using color-coded triangulation in surgery.

SUMMARY

One embodiment provides a method for depth determination of a surface of a test object, in which a colored fringe pattern which is formed from a sequence of colored fringes is projected onto a surface of the test object, in which a fringe pattern that is reflected by the surface of the test object is captured and evaluated using an evaluation apparatus, wherein the colored fringe pattern and the evaluation apparatus are configured such that the depth determination of the surface of the test object is performed using the sequence of colored fringes of the reflected fringe pattern and using a sequence of widths of the fringes of the reflected fringe pattern.

In one embodiment, a colored fringe pattern is used which is formed from the primary colors red, green and blue, and/or the mixed colors thereof, and/or black.

In one embodiment, the colored fringe pattern is formed such that if at least one primary color is extinguished, the sequence of the widths of the fringes of the reflected fringe pattern is obtained.

In one embodiment, the sequence of the colored fringes of the colored fringe pattern is derived from a previously known sequence of the widths of the fringes of the reflected fringe pattern such that, if at least one primary color is extinguished from the colored fringe pattern, the previously known sequence of the widths of the fringes is produced.

In one embodiment, the extinction of at least one primary color in the reflected fringe pattern is effected by an absorption of the primary color.

In one embodiment, the depth determination of the surface of the test object is ascertained from a first and second partial region of the captured reflected fringe pattern, wherein in the first partial region, the depth determination is effected by means of the sequence of the colored fringes, and in the second partial region it is effected by means of the sequence of widths of the fringes of the reflected fringe pattern.

In one embodiment, the second partial region is determined by a threshold value.

In one embodiment, white light is projected onto the surface of the test object and an image of the white light reflected by the test object is captured, wherein the determination of the threshold value is effected using a comparison of the reflected image of the white light and the reflected fringe pattern.

In one embodiment, the reflected fringe pattern is captured by way of a three-chip camera.

In one embodiment, the sequence of the widths of the fringes of the reflected fringe pattern is obtained from a signal of a single chip of the three-chip camera.

In one embodiment, the colored fringe pattern is produced by way of a slide.

In one embodiment, the sequence of the colored fringes of the colored fringe pattern is randomly generated.

In one embodiment, the test object is surrounded by a complex liquid.

In one embodiment, blood is used as the complex liquid.

Another embodiment provides an apparatus for determining the depth of a surface of a test object, comprising a projection apparatus which is designed for projecting a colored fringe pattern onto a surface of the test object, a capturing apparatus which is provided for capturing a fringe pattern which is reflected by the surface of the test object, and an evaluation apparatus which is designed for the depth determination of the surface of the test object using a sequence of colored fringes of the reflected fringe pattern and using a sequence of widths of the fringes of the reflected fringe pattern.

BRIEF DESCRIPTION OF THE DRAWINGS

Example aspects and advantages of the invention are described below with reference to the drawings, in which:

FIG. 4 shows a schematic flowchart of the method for the depth determination of a surface of a test object.

DETAILED DESCRIPTION

Figure 1:
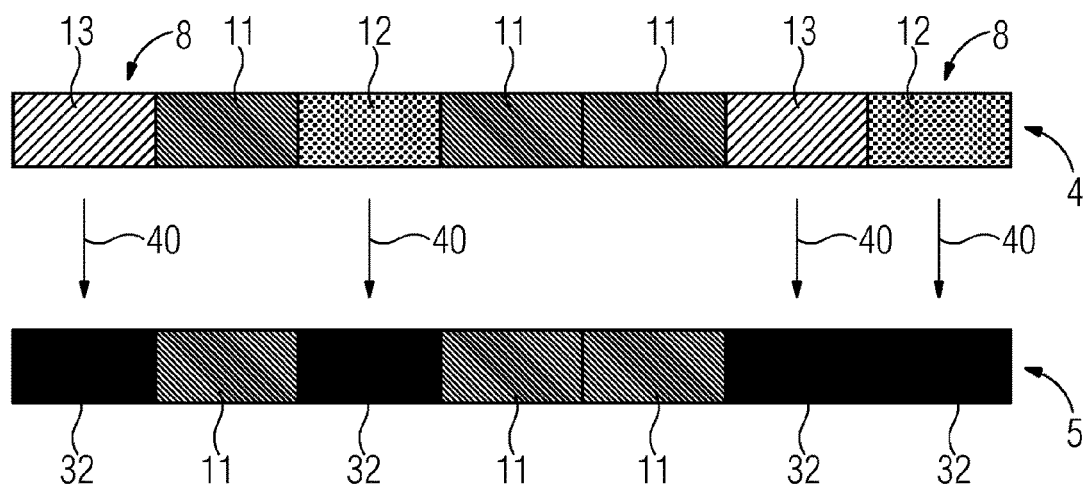
FIG. 1 shows a sequence of colored fringes comprising three colors and a sequence of widths of fringes which is formed as a result of the sequence of the colored fringes.

Embodiments of the present invention provide an improved color-coded triangulation method.

Some embodiments provide a method for depth determination of a surface of a test object, in which a colored fringe pattern which is formed from a sequence of colored fringes is projected onto a surface of the test object, in which an fringe pattern that is reflected by the surface of the test object is captured and evaluated using an evaluation apparatus, wherein the colored fringe pattern and the evaluation apparatus are configured such that the depth determination of the surface of the test object is performed using the sequence of colored fringes of the reflected fringe pattern and using a sequence of widths of the fringes of the reflected fringe pattern.

The depth determination of the surface of the test object may be performed using the sequence of the colored fringes of the reflected fringe pattern and using the sequence of the widths of the reflected fringe pattern. In other words, the sequence of the colored fringes forms a color code, and the sequence of the widths of the fringes of the reflected fringe pattern forms a width code. The evaluation apparatus is here designed for evaluation of the color code and the width code.

The present width code advantageously makes possible an improvement of the correspondence problem. The correspondence problem refers to the problem that an image point of the projected colored fringe pattern and an image point of the captured reflected fringe pattern must be identifiable as the same image point so as to produce a triangle, on which the triangulation is based.

The projected colored fringe pattern may comprise at least two codes, one color code and one width code, to address or improve the correspondence problem. As a result, the identifiability of corresponding image points is improved. The improvement of the correspondence problem which is achieved thereby advantageously reduces the number of skips in the captured and evaluated reflected fringe pattern, with the result that the depth determination of the surface of the test object is improved.

The apparatus for determining depths of a surface of a test object may comprise a projection apparatus which is designed for projecting a colored fringe pattern onto a surface of the test object, a capturing apparatus which is provided for capturing a fringe pattern which is reflected by the surface of the test object, and an evaluation apparatus which is designed for the depth determination of the surface of the test object using a sequence of colored fringes of the reflected fringe pattern and using a sequence of widths of the fringes of the reflected fringe pattern.

The evaluation apparatus may be designed for evaluating a color code—a sequence of the colored fringes of the reflected fringe pattern—and a width code—a sequence of the widths of the fringes of the reflected fringe pattern. The result is advantages which are of identical nature and equal value as in the disclosed method.

According to one embodiment, a colored fringe pattern is used which is formed from the primary colors red, green and blue, and/or the mixed colors thereof, and/or black.

As a result, eight colors, red, green, blue, yellow, magenta, cyan, black and white, are advantageously available for the color-coded triangulation. With the advantageous use of eight colors, the correspondence problem is further alleviated and the depth determination is thus improved. Mixing the colors red and green gives yellow, mixing the colors blue and red gives magenta, mixing the colors blue and green gives cyan, and mixing the colors red, green and blue gives white. The absence of a color is referred to as the color black. Mixing the colors is consequently understood to mean the additive color mixing of the primary colors red, green or blue.

With the advantageous use of at least eight colors, color-coded triangulation is provided which has a simple setup and which permits the depth determination in a test object which is also moving. Such color-coded triangulation based on the stated eight colors is advantageous in particular if used in minimally invasive surgery.

According to one embodiment, the colored fringe pattern is formed such that if at least one primary color is extinguished, the sequence of the widths of the fringes of the reflected fringe pattern is obtained.

Extinguishing at least one primary color here refers to an omission of the primary color from the colored fringe pattern. The omission of the primary color can, for example, be the result of color errors which are caused by reflections at the surface of the test object. If the color of a fringe of the colored fringe pattern is the primary color that is omitted, this fringe transitions into the color black owing to the omission of the primary color. If the color of the fringe is a mixed color, the color of the fringe in the case of an omission of a primary color transitions into a primary color or into a mixed color which is produced from the non-omitted primary colors. By way of example, owing to the omission of the primary color blue, the color magenta becomes the color red, or owing to the omission of the primary color green, the color yellow becomes the color red, while owing to the omission of the primary colors blue and green, the color cyan consequently becomes black.

By extinguishing the at least one primary color from the color code of the projected colored fringe pattern and/or the captured reflected fringe pattern, advantageously a width code is formed. If two out of three primary colors are omitted, the result is a monochromatic width code which comprises, by way of example, only red and black fringes of different widths.

The evaluation apparatus provided for evaluating the width code may use the width code which is the result of the extinction of the at least one primary color from the sequence of the fringes of the reflected fringe pattern for the depth determination.

In one embodiment, the sequence of the colored fringes of the colored fringe pattern is derived from a previously known sequence of the widths of the reflected fringe pattern such that, if at least one primary color is extinguished from the colored fringe pattern, the previously known sequence of the widths of the fringes is produced.

In other words, first the width code is established. Here, the width code can be randomly generated. Subsequently a color code is determined from the previously known and established width code, wherein, owing to extinction of at least one primary color of the color code, the previously known width code is produced. Adjustment of the evaluation apparatus to the width code and/or color code can be effected by way of a calibration.

In one embodiment, the extinction of the at least one primary color in the reflected fringe pattern is effected by an absorption of the primary color.

In other words, the at least one primary color, in particular at least two primary colors, is/are absorbed by the test object. By way of example, blood absorbs the primary colors green and blue. By absorbing the primary colors green and blue, these transition into black in the reflected fringe pattern. Owing to the absorption of the primary colors blue and green, all colors (primary colors or mixed colors) which are formed without the color red consequently transition into the color black, whereas all colors which contain the primary color red become the color red. This gives a sequence of red and black fringes of varying widths which make up the width code for the depth determination.

According to one embodiment, the depth determination is ascertained from a first and second partial region of the captured reflected fringe pattern, wherein in the first partial region, the depth determination is effected by means of the sequence of the colored fringes, and in the second partial region it is effected by means of the sequence of widths of the fringes of the reflected fringe pattern.

In other words, the depth determination is ascertained using the color code in the first partial region, and using the width code in the second partial region. This is advantageous because, for example in strongly absorptive partial regions that form the second partial region of the test object, depth determination of the strongly absorptive partial regions (second partial region) is made possible by way of the width code. Here, a strongly absorptive partial region is considered to be a partial region of the surface of the test object which has an absorption such that it is not possible or only possible with difficulty to ascertain or determine the colors of the fringes present in the partial region.

It is generally advantageous to carry out the depth determination using the color code, since color-coded triangulation—compared to the depth determination using a width code—permits higher resolution. However, if said color code is present only insufficiently in the second partial region, for example owing to absorption of primary colors of the color code, it is advantageously possible for depth determination to be performed in the second partial region using the width code, albeit with lower resolution. In other words, in the second partial region of the test object, the used code is switched from the color code to the width code, with the width code lying hidden in the color code of the projected colored fringe pattern.

The use of the width code in the second partial region can be determined by way of a threshold value.

By way of example, the use of the width code is determined from a noise threshold value. If noise and consequently an error in the identification of the individual colors of the reflected fringe pattern in the second partial region exceeds the stated noise threshold value, the depth determination in the second partial region is effected using the width code. In the remaining partial regions (first partial region) of the surface of the test object, depth determination is effected using the color code, since the noise in said first partial region is below the noise threshold value. Here, the evaluation apparatus detects and identifies the noise threshold value and automatically switches between width code and color code. The skips which, based on the noise, would be present in the second partial region can consequently be avoided by using the width code which is lying hidden in the color code. As a result, the depth determination of the surface of the test object is improved.

In one embodiment, white light is projected onto the surface of the test object and an image of the white light reflected by the test object is captured, wherein the determination of the threshold value is effected using a comparison of the reflected image of the white light and the reflected fringe pattern.

In other words, a color matching is made possible by way of the reflected image of the white light. For each partial region of the surface of the test object, a decision can be made here, by way of forming a threshold value or a ratio—with respect to the projected colored fringe pattern—for the colors of the reflected fringe pattern, as to whether the color code and/or the width code is used for the depth determination in the observed partial region.

The reflected fringe pattern is preferably captured using a three-chip camera. The primary colors red, green and blue of the reflected fringe pattern are advantageously captured individually using the three-chip camera. A parallel, in particular simultaneous evaluation of the primary colors is envisaged.

It may be preferred to obtain the sequence of the widths of the fringes of the reflected fringe pattern (width code) from a signal of a single chip of the three-chip camera.

This may advantageously permit a simultaneous and parallel evaluation and capturing of the color code and of the width code.

If the width code is formed using a primary color, such as red, and the color black, the width code is ascertained from the signal of the chip which is provided for capturing the color red. The color black is here an absence of the color red, wherein the absence of the color red can in turn be defined by way of a threshold value.

According to one embodiment, the colored fringe pattern is produced using a slide.

In other words, the projection apparatus is configured in the form of a slide projector. Further projection apparatuses, for example projectors which comprise a diffractive optical element (DOE for short), can be provided (DOE projectors).

According to one embodiment, the sequence of the colored fringes of the colored fringe pattern is randomly generated.

Random generation of the sequence of the fringes of the colored fringe pattern is a simple and resource-saving way of generating the color code. What must be ensured here is that the randomly generated color code, after it has been generated, is examined for ambiguities. If such ambiguities are found, it is possible for example to perform a new random generation of the color code. This is continued until a color code without ambiguities is obtained. The width code is also randomly generated in the process, with the result that an examination of the width code for ambiguities is also carried out.

According to one embodiment, the test object is surrounded by a complex liquid, in particular blood.

Blood nearly completely absorbs the primary colors green and blue of the projected colored fringe pattern. In other words, light at a wavelength of below 600 nm is nearly completely absorbed by blood. Thus, the present invention may be preferred for test objects surrounded by blood, such as organic tissue, for example. As a consequence, the present invention may be advantageous in minimally invasive surgery.

FIG. 1 shows a sequence of colored fringes 8 which forms a color code 4. The color code 4 is formed here using three primary colors, red 11, green 12 and blue 13. By way of an extinction 40 of the primary colors green 12 and blue 13, for example on account of absorption, the color code 4 transitions into a sequence of widths of fringes which form a width code 5. The width code 5 here comprises the colors red 11 and black 32, with black 32 characterizing the absence of a color. The absence of a color is caused for example by the extinction 40 or absorption of the color. An evaluation apparatus (not illustrated) is configured for evaluating the color code 4 and the width code 5.

Figure 2:
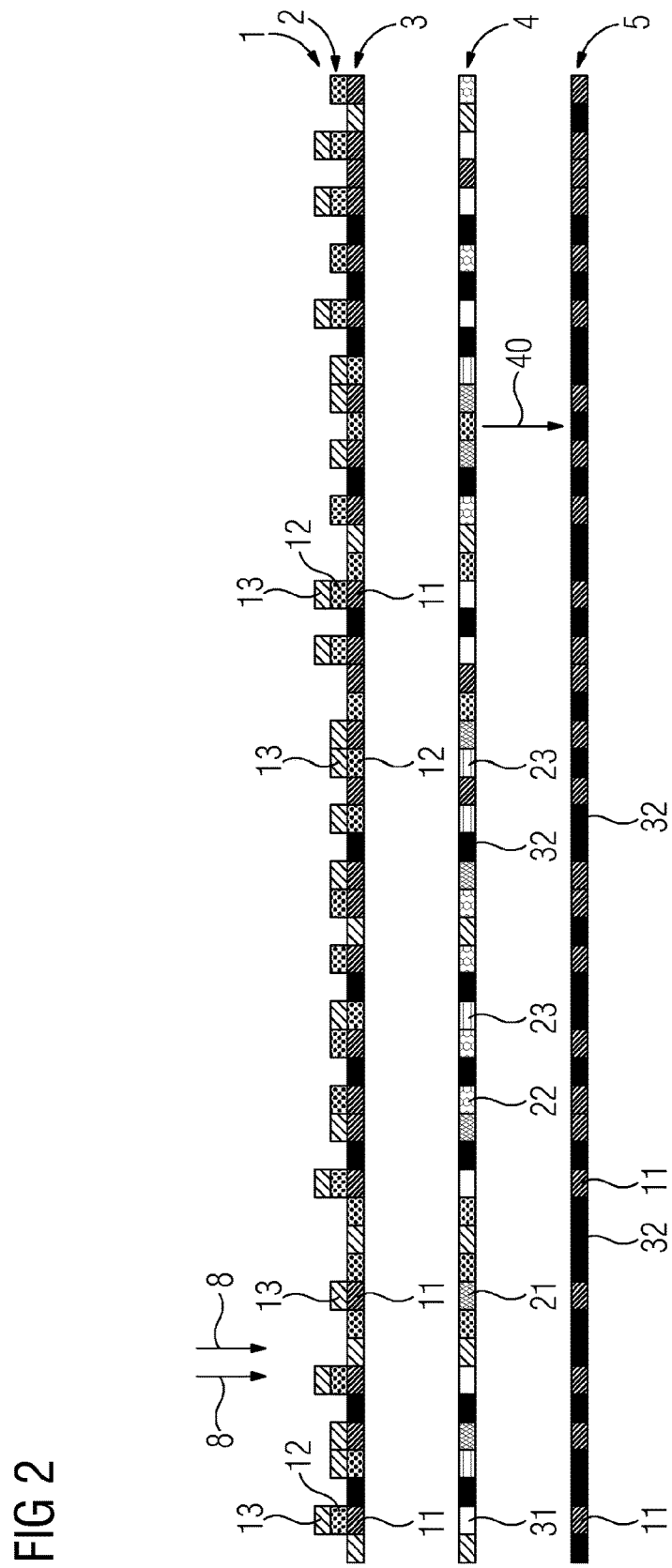
FIG. 2 shows a sequence of colored fringes comprising eight colors and a sequence of widths of fringes which is formed as a result of the sequence of the colored fringes.

FIG. 2 illustrates a formation of a sequence of widths of fringes—width code 5—from a sequence of colored fringes 8—color code 4. In this case, the color of a fringe 8 of the color code 4 is formed from three primary colors 1, 2, 3. The primary colors 1, 2, 3 used are colors red 11, green 12 and blue 13. This gives the mixed colors yellow 22, magenta 21, cyan 23 and white 31. The color black 32 characterizes the absence of a color. Yellow 22 is the result of additive color mixing of red 11 and green 12, magenta 21 the result of additive color mixing of red 11 and blue 13, and cyan 23 is the result of additive color mixing of green 12 and blue 13.

Owing to an extinction 40 or an omission 40 of the primary colors green 12 and blue 13, the width code 5 is produced from the color code 4. The width code 5 consequently comprises the two colors red 11 and black 32, with the result that a monochromatic width code 5 is obtained. The extinction 40 of the primary colors green 12 and blue 13 is the consequence of an absorption 40, for example by blood (not illustrated). In other words, owing to absorption of the primary colors green 12 and blue 13, the color code 4 transitions into the width code 5, which is evaluable by an evaluation apparatus (not illustrated).

Optically speaking, the color red 11 is characterized by a dominating spectral range above 600 nm, the color green 12 by a dominating spectral range of 520 nm to 565 nm, and the color blue 13 by a dominating spectral range from 460 nm to 480 nm. The mixed colors yellow 22, magenta 21, cyan 23 and white 31 are formed by additive color mixing of the primary colors red 11, green 12 and blue 13.

Figure 3:
FIG. 3 shows a first and a second partial region of a test object.

FIG. 3 illustrates a first and second partial region 16, 18 of a surface of a test object, wherein the surface comprises at least a portion of the total surface of the test object. A colored fringe pattern is here projected onto the surface of the test object, and a reflected fringe pattern 7 is captured. The fringes 8 of the reflected fringe pattern 7 each exhibit one of the eight colors red 11, green 12, blue 13, magenta 21, yellow 22, cyan 23, white 31 and black 32.

The second partial region 18 of the surface of the test object is covered by blood 42. As a result, the second partial region 18 exhibits nearly complete absorption 40 of the primary colors green 12 and blue 13.

FIG. 3 shows that, owing to the absorption 40, the colors green 12, blue 13 and cyan 23 transition into the color black 32. The colors magenta 21, yellow 22 and white 31 transition into red 11. After reflection, red fringes substantially stay the color red 11.

Owing to the extinction 40 of the colors green 12, blue 13 and cyan 23 in the second partial region 18, which is caused by absorption, a width code 5 is produced which is used for the depth determination of the surface of the test object in the second partial region 18. Outside of the strongly absorptive second partial region 18, i.e. in the first partial region 16, with the first partial region 16 only being weakly absorptive, the depth determination of the surface of the test object is effected using the color code 4. As a result, skips in the color code 4, which are caused by the second partial region 18, are closed by an evaluation of the width code 5 in the second partial region 18 with the result that a nearly gap-less and unique depth determination of the surface of the test object becomes possible.

FIG. 4 illustrates a schematic flowchart of the method for depth determination of a surface of a test object.

In a first step S1, a colored fringe pattern is formed from a sequence of colored fringes. The sequence of the colored fringes of the colored fringe pattern can be randomly generated here.

In a second step S2, the formed colored fringe pattern is projected onto the surface of the test object using a projection apparatus. In particular, organic tissue surrounded by blood is envisaged as the test object.

In a third step S3, a fringe pattern which is reflected by the surface of the test object is captured. Capturing takes place for example using a camera, in particular using a three-chip camera.

In a fourth step S4, the depth determination takes place using an evaluation apparatus, wherein the depth determination is effected by means of an evaluation of a color code S41 and by means of an evaluation of a width code S45.

This advantageously makes possible a color-coded triangulation method which synergetically combines a color code and a width code, as a result of which the depth determination of the surface of the test object in absorptive test objects is improved. The described invention is advantageous in particular in minimally invasive surgery, for example when using endoscopes.

Even though the invention is illustrated and described in more detail by the preferred exemplary embodiments, the invention is not limited by the disclosed examples, and other variations can be derived therefrom by the person skilled in the art without deviating from the scope of protection of the invention.

What is claimed is:

1. A method for depth determination of a surface of a test object, the method comprising:
   projecting a colored fringe pattern formed from a sequence of colored fringes onto a surface of the test object, each colored fringe having a standard projected width,
   capturing a fringe pattern reflected by the surface of the test object, and
   evaluating the reflected fringe pattern to determine a depth of the surface of the test object based at least on:
   (a) the sequence of colored fringes of the reflected fringe pattern, and
   (b) a sequence of determined widths of the fringes of the reflected fringe pattern wherein a determined width different from the standard projected width indicates extinction of at least one color of the colored fringe pattern.

2. The method of claim 1, wherein the colored fringe pattern is formed from at least one of (a) colors red, green, and blue, (b) mixed colors of the colors red, green, and blue, or (c) black mixed with the colors red, green, and/or blue.

3. The method of claim 2, wherein the sequence of the colored fringes of the colored fringe pattern is derived from a previously known sequence of the widths of the fringes of the reflected fringe pattern such that the previously known sequence of the widths of the fringes is produced by the extinction of at least one primary color from the colored fringe pattern.

4. The method of claim 1, wherein the extinction of at least one primary color in the reflected fringe pattern is effected by an absorption of the primary color.

5. The method of claim 1, comprising determining the depth of the surface of the test object from a first partial region and second partial region of the captured reflected fringe pattern,
    wherein in the first partial region, the depth determination is effected based on the sequence of the colored fringes, and in the second partial region the depth determination is effected based on the sequence of widths of the fringes of the reflected fringe pattern.

6. The method of claim 5, wherein the second partial region is determined by a threshold value.

7. The method of claim 6, comprising projecting white light onto the surface of the test object, and capturing an image of the white light reflected by the test object,
    wherein the threshold value is determined based on a comparison of the reflected image of the white light and the reflected fringe pattern.

8. The method of claim 1, wherein the reflected fringe pattern is captured using a three-chip camera.

9. The method of claim 8, wherein the sequence of the widths of the fringes of the reflected fringe pattern is determined from a signal of a single chip of the three-chip camera.

10. The method of claim 1, wherein the colored fringe pattern is produced using a slide.

11. The method of claim 1, wherein the sequence of the colored fringes of the colored fringe pattern is randomly generated.

12. The method of claim 1, wherein the test object is surrounded by a complex liquid.

13. The method of claim 12, wherein the complex liquid comprises blood.

14. An apparatus for determining the depth of a surface of a test object, the apparatus comprising:
    a projection apparatus configured to project a colored fringe pattern onto a surface of the test object, the colored fringe pattern including a randomly generated sequence of colors;
    a capturing apparatus configured to capture a fringe pattern reflected by the surface of the test object, and
    a processor configured to perform the depth determination of the surface of the test object based on (a) a sequence of colored fringes of the reflected fringe pattern and (b) a sequence of determined widths of the fringes of the reflected fringe pattern wherein a determined width different from the standard projected width indicates extinction of at least one primary color of the colored fringe pattern.

* * * * *